(12) United States Patent
Al-Kazily et al.

(10) Patent No.: US 7,042,586 B2
(45) Date of Patent: May 9, 2006

(54) NETWORK BASED SYSTEM AND METHOD FOR UNIVERSAL PRINTING

(75) Inventors: Binnur Al-Kazily, Star, ID (US); Craig R. White, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 814 days.

(21) Appl. No.: 09/874,482

(22) Filed: Jun. 4, 2001

(65) Prior Publication Data

US 2002/0181016 A1    Dec. 5, 2002

(51) Int. Cl.
G06F 15/00 (2006.01)
G06F 15/173 (2006.01)

(52) U.S. Cl. .................. 358/1.15; 358/1.15; 709/229
(58) Field of Classification Search ............... 358/1.15; 399/8, 81; 709/208, 229, 238, 245; 455/410; 707/200, 205; 370/352, 400
See application file for complete search history.

(56) References Cited

U.S. PATENT DOCUMENTS 6,453,127 B1 *   9/2002   Wood et al. ................... 399/8
2004/0068549 A1 *   4/2004   Motoyama .................. 709/208

FOREIGN PATENT DOCUMENTS

EP    0886206 A2    12/1998
EP    1026578 A2    8/2000
WO    WO0041064    7/2000

* cited by examiner

Primary Examiner—Kimberly Williams
Assistant Examiner—Saeid Ebrahimi-Dehkordy

(57) ABSTRACT

A universal printing system of the present invention is provided for remotely accessing and printing documents on any internet addressable printer. The universal printing system includes at least one remote communication device (RCD), a printer object or "remote printer", and a network addressable device linked to the RCD and the remote printer. The network addressable device is constructed of various software components or processes operating on a communications network, such as the Internet for example. The network addressable device includes a document storage assembly and a universal remote interface assembly linked to the document storage assembly and the printer object. The universal remote interface assembly receives a document command from the RCD via a document command message sent in a SMTP code structure. The document command is provided for accessing the document storage assembly and for transmitting a print job command to the printer object in an internet addressable protocol code structure. In addition, the document command may include the additional operating instructions of finding a document and synchronizing between documents as well as publishing a document content index. Optionally, with a document contact card attached with the document command message, the network addressable device optimally references a desired document for implementing a document command thereto. In effect, through the network addressable device, a user of a RCD stores, retrieves, and/or prints documents on a remote printer in an internet addressable protocol code structure.

16 Claims, 7 Drawing Sheets

Document Name - Contact Card

File  Edit  View  Insert  Format  Tools  Actions  Help

Save and Close

| General | Details | Activities | Certificates | All Fields |

Full Name... | Document Name
Job title:
Company:
File as: Document Name ▽

Business  ▽ 208-555-5555
Home  ▽
Business fax  ▽
Mobile  ▽

Address... 
Business ▽

☐ This is the mailing address

E-mail  ▽ server@some.e-mail.com

Web page address  http://Documents URL

This would be the document description.
Details tab would include additional information, such as keywords.

Contacts...  Binnur Al-Kazily  Categories...  Documents  ☐ Private

FIG. 2B

NETWORK BASED SYSTEM AND METHOD FOR UNIVERSAL PRINTING

FIELD OF THE INVENTION

This invention relates to software components that constitute a system and method for retrieving and printing documents. In particular, the invention relates to a communications network based system and method for remotely accessing and printing documents on any internet addressable printer.

BACKGROUND OF THE INVENTION

As the number of network user subscribers continues to increase, at the turn of the twenty-first century, communications networks, such as the Internet, are expanding. Today, communications networks are growing due, in part, to a new variety of devices called remote communications devices (hereinafter "RCDs") that provide user subscribers access to these networks. RCDs provide an alternative to the original and most common means for accessing communications networks, a stationary personal computer and a modem.

In this disclosure and appended claims the term "remote communications devices" or "RCDs" refers to any and all nonstationary devices that access communications networks. For example, RCDs include internet appliances including Compaq Corporation's IPAQ, laptop computers and, most especially, wireless devices including wireless telephones, Motorola SKYTEL pagers and/or PALM PILOTS.

Because of this explosive growth of communications networks and the introduction of RCDs, commercial business activities are increasingly conducted outside of a traditional office space environment where one works with a stationary computer in an office building each workday. Today, RCDs enable a mobile workforce to conduct business activities virtually anywhere.

Unfortunately, existing document management software component systems for retrieving and printing documents, or entire document files, are primarily configured for printers that are included as part of standard stationary computer workstations. Driver software for a printer typically accompanies each printer and is loaded onto a computer workstation in order to operate that respective printer. Moreover, driver software varies with each make and model of printer. To the detriment of computer memory and speed, an intranet computer workstation may have several printer software drivers loaded in memory so as to operate a wide variety of network printers.

The stress on computer memory and speed is further compounded if documents need to be printed from an Internet communications network, such as for example documents from a Uniform Resource Locator (URL) or "website". Often, a website requires that website specific operating software be downloaded onto a desired computer workstation before that particular workstation printer is capable of printing documents from the website. Again, this additional software necessarily compromises computer memory.

Accordingly, existing document management software component systems are commonly installed within computer workstation memory devices and/or on a URL. Ultimately, however, existing document management systems invariably require support software for accessing and printing documents, such as printer drivers. Storing additional software on RCDs is a problem in that RCDs commonly do not have the same large memory capacity as stationary workstation computers. As a result, increased memory storage on RCDs greatly decreases their optimum operational memory capacity.

Illustratively, it is often difficult for a salesperson's laptop portable computer to print sales brochures using a customer's office printer. Specifically, if a document management system is accessed within the laptop, a salesperson's portable computer typically requires driver software for that customer's printer and/or hardware interfaces, such as additional cables or ports, for successfully printing a sales brochure. Alternatively, if a document management system is administered by a website, a salesperson's portable computer typically requires driver software for that customer's printer as well as relevant website specific operating software. In either case, the speed and memory of the RCD is compromised.

Because existing document management systems do not easily accommodate remote printing with RCDs, the mobile workforce must often anticipate what they might need and, therefore, carry it with them wherever they go. In the continuing example, other less-than-ideal measures are taken because salespersons cannot print brochures with a laptop according to a customer's needs. A salesperson often has no other choice but to engage in the physical burden of carrying hard copies of every sales brochure on each customer visit. Alternatively, if there are too many brochures, a salesperson must engage in the inefficient sales approach of sending the appropriate brochure(s) to the customer often weeks after the initial excitement of the first sales visit is over.

Thus, as a matter of maximizing business efficiency by maintaining the highest optimal operational speed and memory capacity for RCDs, there is a clear need for a document management system for enabling a RCD to print anywhere with any printer without additional support software added to that RCD's memory and without compromising the speed of the RCD. Illustratively, a salesperson should be able to send a print command from their laptop or wireless device to a customer's office printer or even a printer at a restaurant while having a business luncheon. Further, there is a need for that salesperson's document management system to print on any localized printer without additional software or hardware.

SUMMARY OF THE INVENTION

Accordingly, a universal printing system of the present invention is provided for remotely accessing and printing documents on any internet addressable printer. It should be added that, in this disclosure and the appended claims, the term(s) "universal" and/or "universal printing" refers to the ability to remotely access and print documents on any internet addressable printer. The universal printing system includes at least one remote communication device (RCD), a printer object or "remote printer", and a network addressable device linked to the RCD and the remote printer. The network addressable device is constructed of various software components or processes operating on a communications network, such as the Internet for example. The network addressable device includes a document storage assembly and a universal remote interface assembly linked to the document storage assembly and the printer object. The universal remote interface assembly receives a document command in a Simple Mail Transfer Protocol (hereinafter "SMTP") or, commonly, "email" code structure. The document command is provided by the RCD to the universal remote interface assembly. Based on the document command, the document storage assembly then accesses the desired document. The universal remote interface then transmits a print job command to the printer object in an internet addressable protocol code structure. In addition, the document command may include the additional operating instructions of finding a document, and synchronizing between documents as well as publishing a document content index. In effect, through the network addressable device, an RCD user stores, retrieves, and/or prints documents on any remote printer that is internet addressable.

The universal remote interface assembly includes a request interface and a document provider, each linked with the document storage assembly. The request interface comprises a SMTP or email server. Through the SMTP, the request interface receives a document command in a SMTP code structure from the RCD. The document provider renders a document(s) according to the document command. The document provider transmits the document(s) from the network addressable device to the remote printer. As such, the document provider preferably generates and transmits a print job command in any appropriate internet addressable protocol, for example in either SMTP or Internet Printing Protocol (hereinafter "IPP").

In the preferred embodiment, the document storage assembly is any commercially available document management system software component of a type well known in the industry. The document storage assembly includes a document indexing engine linked with the request interface and a document repository linked with the document provider. The document indexing engine synchronizes between documents and generates a contents index based on the document command. The document repository stores a document(s) and sends a document(s) to the document provider.

In a preferred embodiment, computer code accompanies the universal printing system. The computer code includes code for a network addressable device. The code for a network addressable device includes code for a universal remote interface assembly. This code for the universal remote interface assembly provides remote access and printing of a document(s) based on a document command. Moreover, this code for the universal remote interface assembly accommodates any commercially available document management system software component of a type well known in the industry.

In a further embodiment of the present invention, a method for remotely accessing and printing documents on a printer object includes linking a universal remote interface assembly with a document storage assembly. The universal interface assembly is preferably accessed remotely via SMTP by a document command from a RCD. The universal remote interface assembly transmits a document(s) in an internet addressable protocol to the printer object based on the document command.

In summary, the universal printing system includes a network addressable device. The network addressable device includes a universal remote interface assembly and a document storage assembly that is of a commercially available type. Through the network addressable device, a user of an RCD stores, retrieves, and/or prints documents on a remote printer. In particular, the universal remote interface assembly provides a user with remote access to the network addressable device via email and preferably transmits a resulting print job command to the remote printer via email and/or the Internet.

DESCRIPTION OF THE DRAWINGS

Other objects, features, and advantages of the present invention will become more fully apparent from the following detailed description of the preferred embodiment, the appended claims and the accompanying drawings in which:

FIG. 2 provides preferred user interfaces for accessing a document storage assembly of the universal printing system of FIG. 1. FIG. 2b is a schematic diagram illustrating a document contact card generated by the remote communication device for expediting remote accessing and printing of a desired document(s) on any internet addressable printer;

DETAILED DESCRIPTION OF THE INVENTION

The preferred embodiment of the present invention is illustrated by way of example in FIGS. 1–6. With specific reference to FIG. 1, a universal printing system 10 includes at least one remote communications device or "RCD" 13, a network addressable device 20, and at least one remote printer 15.

The RCD 13 is a standard RCD of a type well known in the industry, such as an internet appliance or a laptop computer or a wireless device including wireless telephones, for example. Preferably, the RCD 13 features "email" capability. This capability is commonly referred in the industry as Simple Mail Transfer Protocol (SMTP).

The network addressable device 20 operates within a communications network 11. In general, the network addressable device 20 receives a document command from the RCD 13 and transmits a print job command to the remote printer 15.

The network addressable device 20 is constructed of various software components or processes operating on a computer or a network of computers. In the preferred embodiment, the software components or processes composing the network addressable device 20 are configured for engagement with communication networks of a type well known in the industry. As such, the communications network 11 preferably comprises the Internet, although those of ordinary skill in the art will readily recognize other communications networks.

The remote printer 15 comprises a printer object. In this disclosure and appended claims, and as is common in the industry, a printer object is defined as accepting protocol operation instructions, whether initially implemented from a communications network server or an end-user device such as a client desktop, and as returning operation responses. In other words, a printer object is any electronic printer, regardless of make and model, that receives and accepts computer software related instructions, i.e. "print job commands", in a predetermined protocol, such as internet addressable protocols, for example SMTP or IPP. With each print job command, the printer object returns an operation response ranging, for example, from spooling the printer object to printing a selected part of a document. According to the present invention, print instructions for enabling operation of any make and model printer object are embedded within computer codes associated with internet addressable protocols. In this application and the appended claims, the term internet addressable protocols refers to code designs for the exchange of messages and errors between a network addressable device within an Internet communications network and a printer object. Although those of ordinary skill in the art will recognize other internet addressable protocols, the internet addressable protocols preferably comprise computer codes in either SMTP or IPP. In effect, by transmitting print job commands with internet addressable protocols, the network addressable device 20 prints on any printer object regardless of make and model.

Figure 1:
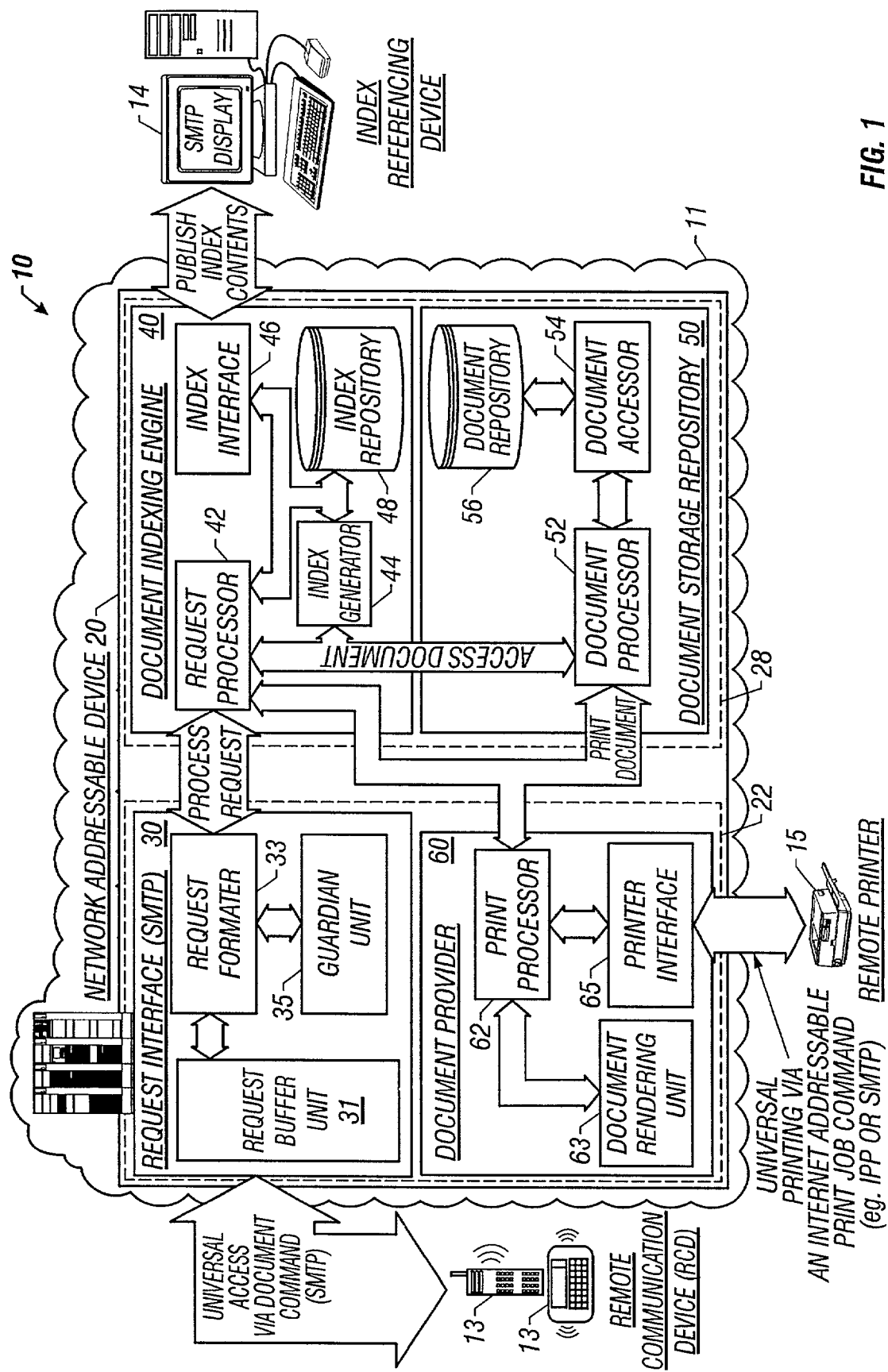
FIG. 1 is a schematic diagram illustrating a universal printing system for providing remote access and printing of documents on any internet addressable printer of the present invention.

Illustratively, in reference to the universal printing system 10 of FIG. 1, a client desktop (not shown) within the RCD 13 initiates a document command for printing a document stored within the network addressable device 20. In operation, by interfacing with the user, the desktop of the RCD 13 generates a document command message of FIG. 2a for carrying a document to the network addressable device 20. The network addressable device 20 receives the document command and retrieves the appropriate document from storage within the network addressable device 20. The network addressable device 20 transmits the document via a print job command to the remote printer 15 in format incorporating an internet addressable protocol. Because the network addressable device 20 executes the print job command with internet addressable protocols, the RCD 13 does not require memory storage of a specific make and model printer driver to operate the remote printer 15. Thus, the network addressable device 20 provides the RCD 13 with optimal operational memory storage.

In general, the network addressable device 20 is divided to include a document storage assembly 28 and a universal remote interface assembly 22 linked to the document storage assembly 28. Those of ordinary skill in the art will readily recognize that the document storage assembly 28 is any recordable file system based storage component having an interface for accessing data associated with the remote interface assembly 22. However, in the preferred embodiment, the document storage assembly 28 comprises any commercially available document management system software component of a type well known in the industry, such as a Microsoft Exchange Network Server or a DOCUMENTUM 4i platform by Documentum, Inc., of Plesanton, Calif.

The universal remote interface assembly 22 is configured to robustly accommodate any file system based storage component. Preferably, the universal remote interface assembly 22 includes code to thus interact with different types of document management systems.

The universal remote interface assembly 22 includes a document provider 60. The document provider 60 transmits a print job command via internet addressable protocols to the remote printer 15. Moreover, through a request interface 30, the universal remote interface assembly 22 provides the RCD 13 remote access to the network addressable device 20, especially access to the document storage assembly 28.

Specifically, in the preferred embodiment, the request interface 30 comprises a SMTP server for receiving document commands from the RCD 13 in email format. As shown in FIG. 1, request interface 30 includes a request buffer unit 31. The request buffer unit 31 receives in memory each document command from the RCD 13.

A request formatter 33 is linked with the request buffer unit 31. The request formatter 33 retrieves each queued document command in the request buffer unit 31 and parses that document command for operation within the network addressable device 20. For example, the request formatter 33 parses each document command according to operand information, such as a document sent by the RCD 13 for direct printing by the remote printer 15, and operating instructions, such as page finding or page formatting commands. To expedite the tasks of referencing a desired document's contents as well as the task of parsing, each document command may optionally include a document contact card 70.

Application software components for generating document contact cards 70 and for interpreting document commands sent by the RCD 13 in an email format are downloaded from the network addressable device 20 to the RCD 13. The application software components contain code in a language that accommodates specialized or, as widely known in the industry, "plug-in" applications, such as JAVA or Microsoft Corporation's ACTIVE X. This code preferably integrates with the desktop of the RCD 13 so that a user wishing to access the network addressable device 20 from the RCD 13 emails a document command message 90. As a plug-in option, a user wishing to access the network addressable device 20 may readily generate and transmit a document contact card 70 from the RCD 13.

Figure 2A:
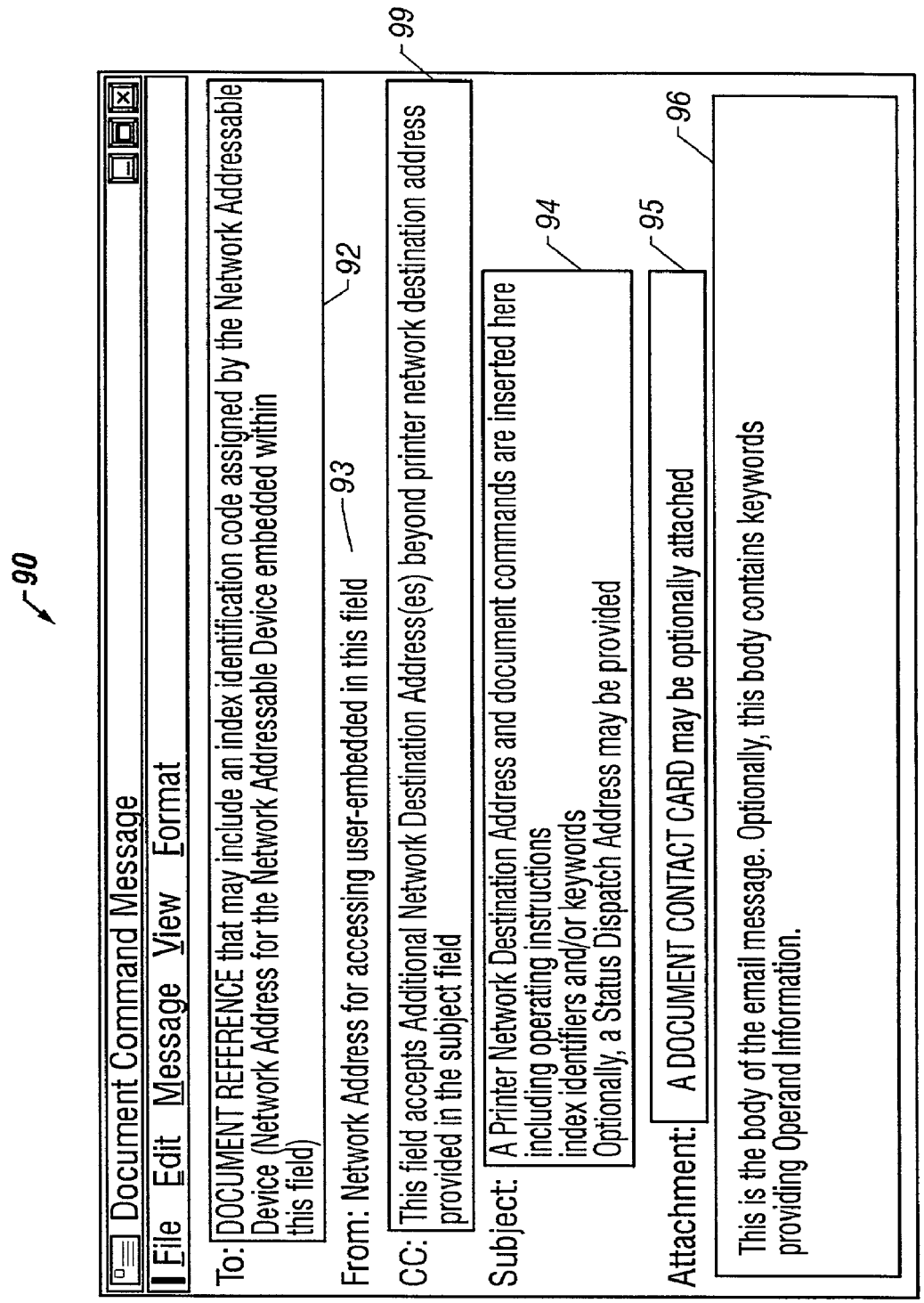
FIG. 2a is a schematic diagram illustrating a document command message generated by a remote communication device of the universal printing system of FIG. 1.

In the preferred embodiment, each document command is an information packet containing a combination of operating instructions as well as operand information. This information packet is rendered in SMTP so that the operating instructions and commands comprising each document command are constructed with standard email protocol code language. Therefore, by accessing standard email message generating application software from a desktop of the RCD 13, such as Microsoft's OUTLOOK EXPRESS a user may send operating instruction and command components for constructing a document command to the network addressable device 20 through a standard email message. FIG. 2a maps the input fields from a standard email message. These input fields allow for input of operating instructions and commands required for creating a document command for execution by the network addressable device 20.

Specifically, FIG. 2a illustrates the document command message 90. The document command message 90 is a standard email message generated by email applications software widely known in the industry, such Microsoft's OUTLOOK EXPRESS, for operation with the network addressable device 20. Application software components sent by the network addressable device 20 for integration with the RCD 13 enable a user to use existing input fields from standard email messages to send commands for accessing document(s) associated with the network addressable device 20. Specifically by using existing input fields from a standard email message, the document command message 90 enables operating instruction and command components comprising a document command to be carried from the RCD 13 to the network addressable device 20.

A send-to field 92 of FIG. 2*a* includes a document reference. The document reference enables the network addressable device 20 to identify the document required by the user. If the required document is already stored by the network addressable device, as opposed to being initially presented to the network addressable device 20, the document reference would include an index. Thus, the document reference may include an index identification code assigned to document(s) already stored by the network addressable device 20. Additionally, the document reference embeds a network address for accessing the network addressable device 20. A send-from field 93 of FIG. 2*a* includes a network address for the RCD 13 of the requesting user.

A subject field 94 includes a printer network destination address for enabling the network addressable device 20 to access the remote printer 15. The subject field 94 receives input relating to operating instructions and operand information that form the basis of a document command 20. These operating instructions and operand information may include keywords and/or index identifiers, each for locating documents stored within the network addressable device 20. Optionally, the subject field 94 may include a status dispatch address. The network addressable device 20 sends information associated with the requested document to the status dispatch address. Examples of information sent to the status dispatch address include command error messages sent to the RCD 13 or for publishing an index list for relevant documents by sending the index list to an index referencing device 14 shown in FIG. 1.

The document command message 90 includes an additional send-to field 99. In addition to the printer network destination address, the additional send-to field 99 enables the network addressable device 20 to send print job commands to other destination network addresses.

The document command message 90 includes an attachment field 95. By using standard SMTP protocol for attaching documents and applications to email messages, the attachment field 95 provides a means for attaching and sending the document contact card 70 along with the document command message 90. The document command message 90 further includes message body field 96. By using standard SMTP protocol for forming a body of an email message, the message body field 96 may accept keywords providing operand information.

With specific reference to FIG. 1, to derive a document command, the request formatter 33 compiles various email message fields for each document command message sent by the respective RCD 13. Each document command is thus formed from various email input fields by the request formatter 33. By compiling various fields from each document command message sent by the respective RCD 13 through SMTP format, the request formatter 33 creates the document command for execution by the network addressable device 20 via the request processor 42. Thereafter, the request processor 42 includes software components for interpreting each document command received from the request formatter 33 so as to parse each document command into operating instructions and operand information for use by the network addressable device 20.

Referring to FIG. 2*b*, as an optional feature, the universal printing system 10 includes the document contact card 70 as a format for expediting document content referencing and parsing tasks executed by the request formatter 33.

Without a document contact card 70, the request formatter 33 constructs a document command by scanning a variety of email input fields from a document command message 90. For the request formatter 33, scanning becomes difficult and time consuming where code structures for these input fields vary according to a variety of email message generating application software in the industry that are integrated with RCDs. However, with the document contact card 70 providing a code structure format for optimal use with the network addressable device 20, the request formatter 33 optimally receives all the operating instruction and operand information components for constructing a document command. With this optimal code structure format provided by a document contact card 70, a document command may be sent from any email message generating application software installed in the RCD 13 for quick response by the network addressable device 20. Therefore, the document contact cards 70 enable the request formatter 33 to readily retrieve components for optimal use in constructing document commands.

Moreover, for expediting document content referencing, a document contact card 70 optimally provides the request formatter 33 with the printer network destination address of the remote printer 15 as well as keywords associated with the desired document. Therefore, the request formatter 33 circumvents the task of scanning through a variety of email input fields from a document command message 90.

FIG. 2*b* illustrates a preferred document contact card 70. In a preferred embodiment, the document contact card 70 includes a sender box 74, a receiver box 75, a document description box 76, and an application tool bar 77. The sender box 74 includes information relating to a user for accessing that users' account with the network addressable device 20. The sender box 74 also includes keyword document identification input fields 81 as well as user identification input fields 82.

The receiver box 75 includes input fields for transmitting desired documents from the network addressable device 20 to a desired remote printer 15. In particular, the receiver box 75 includes a surface mail address input field 84, an email address input field 85, and a webpage address input field 86.

The document description box 76 includes a keyword document description input field 88. The keyword document description input field 88 features detailed keyword operand information for locating desired documents, such as relevant text excerpts, the date created, and the pagination of a desired document, for example. The application tool bar 77 includes input fields for receiving operating instructions.

With or without the document contact card 70, once a document command is parsed, the request formatter 33 then preferably implements a security check. According to FIG. 1, the request interface 30 may further include a guardian unit 35 linked with the request formatter 33. The guardian unit 35 enables the request formatter 33 to implement the security check of each incoming document command during a validation process. As outlined in further detail below as a part of a remote processing sequence 100, the validation process verifies the integrity of each incoming document command for operational and user compatibility with the network addressable device 20.

In particular, before forwarding a document command to the document storage assembly 28, the request formatter 33 sends that document command to the guardian unit 35 for performing a security operation sequence. In the sequence, the guardian unit 35 verifies whether the user may legitimately access the network addressable device 20 to fulfill the document command. Optionally, the guardian unit 35 verifies whether access to the selected remote printer 15 is restricted to certain users. In addition, the request formatter 33, through the guardian unit 35, may collect revenue from a user as part of the validation process.

On successful execution of this security operation sequence, each parsed document command is forwarded by the request formatter 33 from the request interface 30 to the document storage assembly 28. It should be added that the request formatter 33 preferably includes software components for accommodating the document storage assembly 28. A document indexing engine 40 of the document storage assembly 28 is linked with the request interface 30 so that each document command is received by the document indexing engine 40.

For the embodiment shown in FIG. 1, document indexing engine 40 includes a request processor 42. The request processor 42 receives each document command from the request formatter 33. The request processor 42 reads each document command and evokes relevant components of the network addressable device 20 for executing each document command.

As a part of reading each document command, the request processor 42 must archive relevant documents associated with that document command. Archiving includes the tasks of either indexing new documents or retrieving relevant documents previously indexed and stored by the document storage assembly 28. In other words, before executing operation instructions associated with each document command, the request processor 42 must first archive, through indexing and retrieval, relevant new and previously stored documents. All documents are preferably indexed by the indexing engine 40 for expedited identification and retrieval by the document storage assembly 28.

By searching for keywords included with operand information from each document command, the request processor 42 invariably determines whether a prior version(s) of a document is stored by the network addressable device 20. As such, the document indexing engine 40 further includes an index generator 44 linked with the request processor 42 and an index repository 48 linked with the index generator 44.

To determine whether a prior version of a document is stored, the request processor 42 sends keyword information to the index generator 44. The index generator 44, in turn, searches the index repository 48 based on keywords to verify whether a prior version of a document exists. This keyword search constitutes a search based on keywords from a document title and/or a direct index identifier for a desired document, such as an alphanumeric code. The index repository 48 maintains an index identification code for each document stored within the document storage assembly 28 having keywords and an index identifier. For example, for an index identification code of "Spanish Printer Sales Manual Ver.5.2", the keywords are "Spanish Printer Sales Manual" and the index identifier is "Ver.5.2" The index generator 44 then reports its search findings to the request processor 42.

If there are no prior documents stored, the request processor 42 assigns an index identification code to each newly introduced document as a reference for future retrieval. The request processor 42 sends each index identification code in the index repository 48 and the associated new documents to a document storage repository 50 for storage. Therefore, after each new document is archived, the request processor 42 then executes the corresponding operation instructions from the document command on the new document. Illustratively, the document indexing engine 40 archives a new document by assigning an index identification code of "Spanish Printer Sales Manual Ver.5.2" and stores the new document in the document storage repository 50. Then, the request processor 42 executes the operating instruction of "print page 5 at the Madrid airport business office printers".

On the other hand, if there are prior documents stored, the request processor 42 directs the index generator 44 to generate a listing of relevant documents. The index generator 44 creates a listing of relevant documents according to index identification codes and/or keywords. As discussed below, this listing may be prioritized to thus form a contents index. For example, "Spanish Printer Sales Manual Ver.5.0, 5.1, 5.2, etc." The index generator 44 then forwards its listing to the request processor 42. The request processor 42 will then execute the corresponding operation instructions from the document command. After reading each document command, the request processor 42 evokes relevant components of the network addressable device 20 for executing corresponding operating instructions on an archived document(s).

Figure 3:
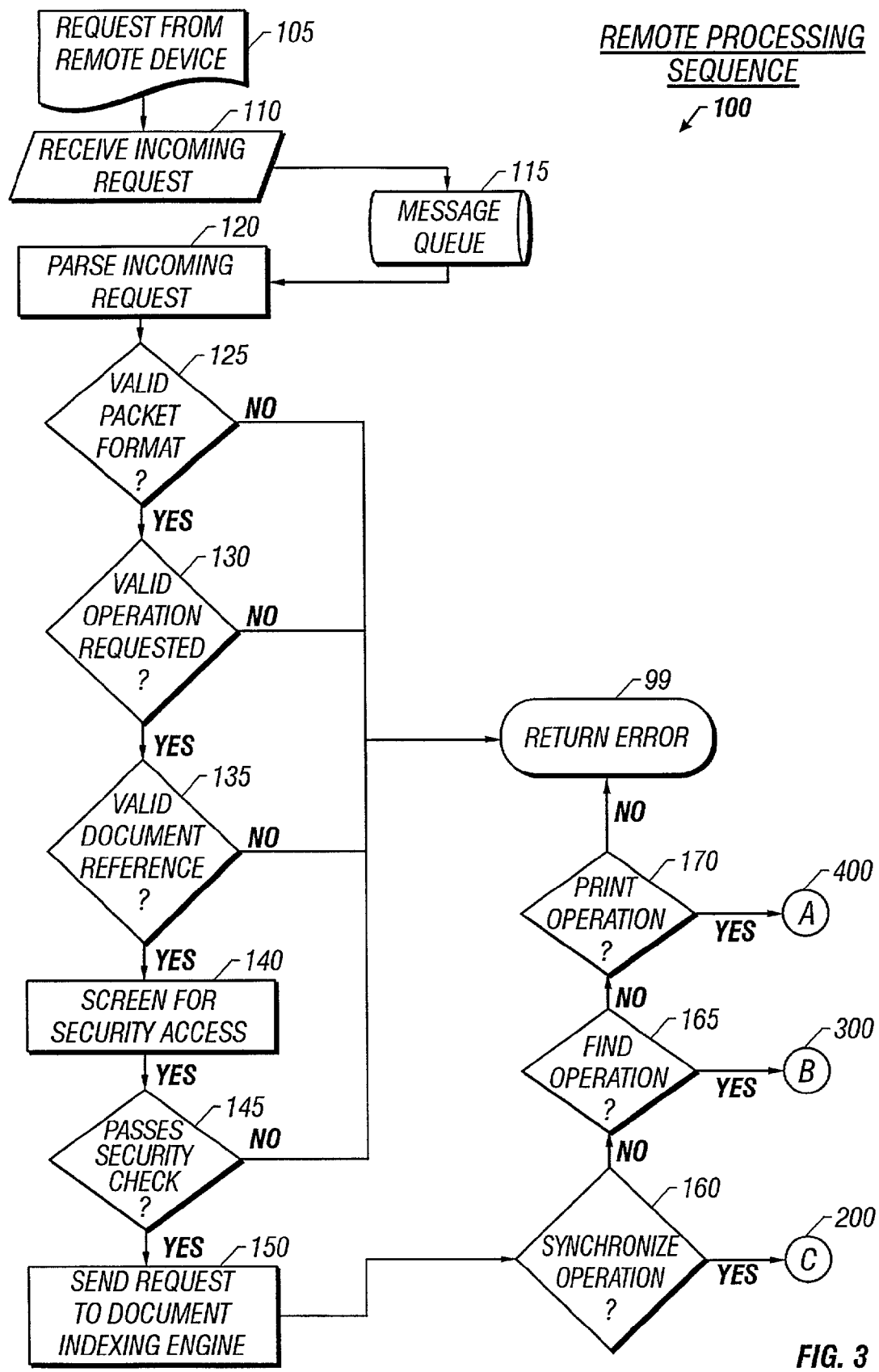
FIG. 3 is a flow diagram illustrating a remote processing sequence executed by the universal printing system of FIG. 1.

FIG. 3 illustrates the remote processing sequence 100 preferably executed by the network addressable device 20 for receiving and executing a document command sent by the RCD 13. In step 105, a document command is sent from the RCD 13 to the network addressable device 20. In step 110, the network addressable device 20 receives the document command and, in step 115, directs the command to the request buffer unit 31. Then, in step 120, the request formatter 33 retrieves the document command from the request buffer unit 31.

In step 120, the request formatter 33 parses the document command to best accommodate the network addressable device 20. It should be added that during step 120 the request formatter 33 integrates attached contact card(s) 70 with parsed information from the document command.

Steps 125–145 clearly outline the above-described validation process executed by the request formatter 33. In step 125, the request formatter 33 applies robust software components to interpret the document command format. For a valid document command format, the request formatter 33 advances from step 125 to step 130. In step 130, the request formatter 33 determines whether the document command includes valid operating instructions for successful execution by the network addressable device 20. With valid operating instructions, the request formatter 33 determines whether the document command includes a valid document reference, such as index identifiers and/or keywords, for each desired document.

For a valid document reference, the request formatter 33 in steps 140 and 145, accesses the guardian unit 35 to implement the above mentioned security check as a part of the validation process. In step 140, the guardian unit 35 verifies whether a user may legitimately access the network addressable device 20 to execute the document command. If the guardian unit 35 and the request formatter 33 determine that the user may legitimately access the network addressable device 20, the remote processing sequence 100 thus advances from step 145 to 150. If the document command is found invalid in steps 125, 130, 135, and/or 145, the request formatter 33 advances to step 99 to indicate an error to the user of the requesting RCD 13.

In step 150, the parsed command is forwarded by the request formatter 33 to the request processor 42. The request processor 42 determines whether the operating instructions from the document command require a synchronization operation in step 160, a find operation in step 165 or a print operation in step 170. If a synchronization operation is requested, the request processor 42 advances from step 160 to the document synchronization sequence 200 of FIG. 4. For a find operation, the request processor 42 advances from step 165 to a document finding sequence 300 of FIG. 5. If a print operation is required, the request processor 42 advances from step 170 to a document printing sequence 400 of FIG. 6.

If the document command indicates an invalid operation instruction, the request processor 42 advances from step 160, 165 or 170 to step 99 to indicate an error to the user of the requesting RCD 13. Although those of ordinary skill in the art will recognize other functions, the network addressable device 20 preferably executes operating instructions associated with displaying a generated index list, finding a document, synchronizing a document, and, most especially, printing a document.

Figure 4:
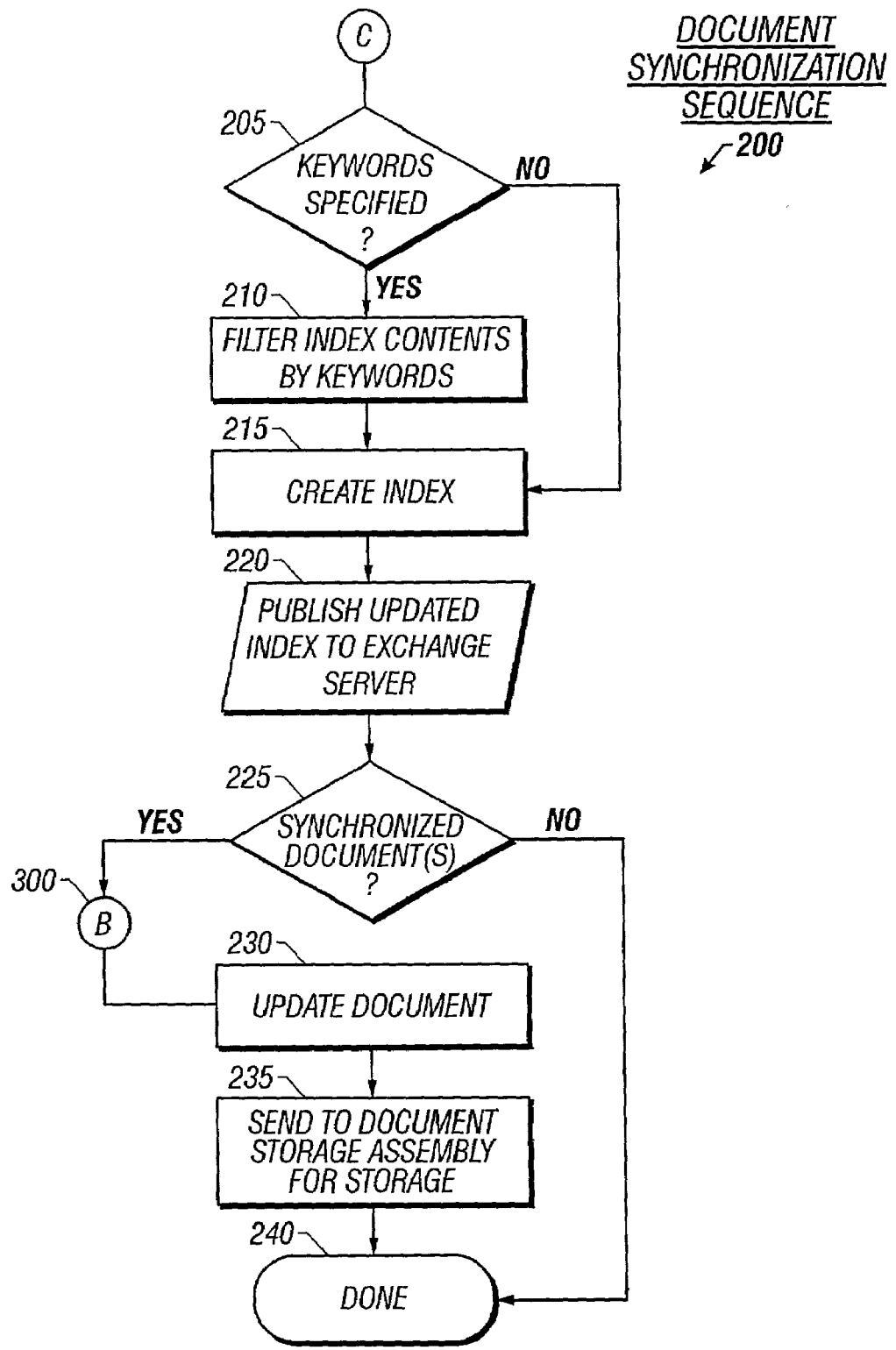
FIG. 4 is a flow diagram illustrating a document synchronization sequence for synchronization of a document between a document received from a remote communications device and a parallel document stored within a document storage assembly, each of the universal printing system of FIG. 1.

Included in the archiving process of either indexing or retrieving documents associated with a document command, the request processor 42 in the synchronization sequence 200, illustrated in FIG. 4, invariably generates an index list as discussed above. Referring to FIGS. 1 and 4, steps 205–220 are provided for generating an index list and for dispatching or "publishing" that list from the network addressable device 20 to an index referencing device 14. Other embodiments of the network addressable device 20 contemplate integrating steps 205–220 with the finding sequence 300 of FIG. 5 and/or the printing sequence 400 of FIG. 6.

As shown in FIG. 1, the index referencing device 14 is defined in this disclosure and appended claims as any electronic device, remote or stationary, that accounts for document activity within the network addressable device 20. To verify whether the request processor retrieves desired document(s), an index list may be sent to the requesting RCD 13 via a status dispatch address supplied by the document command message 90. For example, a salesperson's RCD 13 sends an updated document index list to a potential client database, a corporate headquarters database, and a fellow salesperson's RCD 13. As such, the client database, the corporate headquarters database, and even the fellow salesperson's RCD are separate examples of an index referencing device.

Optionally, the document indexing engine 40 includes an index interface 46, shown in FIG. 1. The index interface 46 is linked with the index generator 44 and the request processor 42. The index interface 46 receives from the request processor 42 an updated index list generated by the index generator 44. The index interface 46 is preferably configured for SMTP publishing of the index list to the index referencing device 14 and/or the RCD 13.

Referring to FIG. 4, steps 205–220 are executed by the document indexing engine 40 for generating and publishing an index list as follows. In step 205, the request processor 42 scans a parsed document command for keyword operand information for locating desired documents, such as relevant text excerpts, for example. If keywords are not provided the request processor 42 advances to step 215. However, if keywords are provided by the document command, the request processor 42 directs the index generator 44 to search for the keywords as related to document(s) stored within the index repository 48. Specifically, the index generator 44 in step 210 filters keywords from a stored index identification code associated with each document before advancing to step 215. For example, if the keywords "Printer Sales Manual" are entered by the RCD 13, the index generator 44 will filter through the index repository and receive "English Printer Sales Projections Ver.10.0" as well as "Spanish Printer Sales Manual Ver.5.0, 5.1, 5.2, etc.".

In step 215, the index generator 44 preferably combines keywords and index identification codes so as to create a prioritized list of index identification codes having the most keywords in descending order of occurrence. The prioritized list of step 215 is referred to as a "contents index." In the continuing example, the index generator 44 lists "Spanish Printer Sales Manual Ver. 5.2" for featuring the most key words of "Printer Sales Manual" and the index identifier "2". Those of ordinary skill in the art will recognize other suitable means for organizing a contents index. Optionally, step 220 is provided so that the request processor 42 may publish the contents index of step 215. Accordingly, through the index interface 46, the request processor 42 sends the contents index to an index referencing device 14 as indicated by operating instructions of the document command.

Steps 225–240 are provided by the document synchronization sequence 200 for retrieving a relevant or "parallel" document(s) from the document storage assembly 28 and updating between the newly submitted document(s) and the parallel document(s). Thus, by reviewing the document command, the request processor 42 in step 225 determines whether document synchronization is desired. If synchronization is not desired, the request processor 42 advances from step 225 to step 240 to complete the document synchronization sequence 200.

If synchronization is desired, the request processor 42 retrieves parallel document(s) from the document storage assembly 28. As such, the request processor 42 finds the relevant parallel documents via the document finding sequence 300 described below before advancing to step 230. For example, given a new document "Spanish Printer Sales Manual Ver.5.2", the request processor retrieves parallel documents of "Spanish Printer Sales Manual Ver.5.0 and Ver 5.1." In step 230, from the operating instructions of the document command, the request processor 42 synchronizes document(s). In the preferred embodiment, the request processor 42 substitutes or "updates" the parallel documents with respect to the newly submitted documents.

Illustratively, the request processor 42 preferably synchronizes a newly revised document submitted to network addressable device 20 so that previous documents stored by the document storage assembly 28 are substituted with the revised document. For example, a synchronized document is designated as "Spanish Printer Sales Manual Ver 5.2S", which is the identical document on newly submitted "Spanish Printer Sales Manual Ver. 5.2" that supercedes the parallel documents of "Spanish Printer Sales Manual Ver 5.0 and 5.1". Other embodiments of the document synchronization sequence 200 contemplate allowing an RCD user to select the desired synchronized version between the newly submitted RCD document(s) and the parallel document(s). Lastly, in step 235, the request processor sends the synchronized document(s) to the document storage assembly 28 for storage before completing the document synchronization sequence 200 in step 240.

Referring to FIG. 1, the document storage assembly 28 includes a document storage repository 50 linked with the request processor 42. The document storage assembly 28 provides remote storage of documents for RCD users through the document storage repository 50.

The document storage repository 50 includes a document processor 52 for receiving document command operating instructions from the request processor 42 as well as a relevant index list from the index generator 44. The document processor 52 ensures that relevant document command operating instructions are executed by the document storage repository 50. The document storage repository 50 further includes a document accessor 54 linked with the document processor 52 and a document repository 56 linked with the document accessor 54. For each index list, the document accessor 52 retrieves a relevant document(s) stored within the document repository 56 and sends the document(s) to the document processor 52. The document processor 52 thus executes document command operating instructions on the retrieved document(s).

Figure 5:
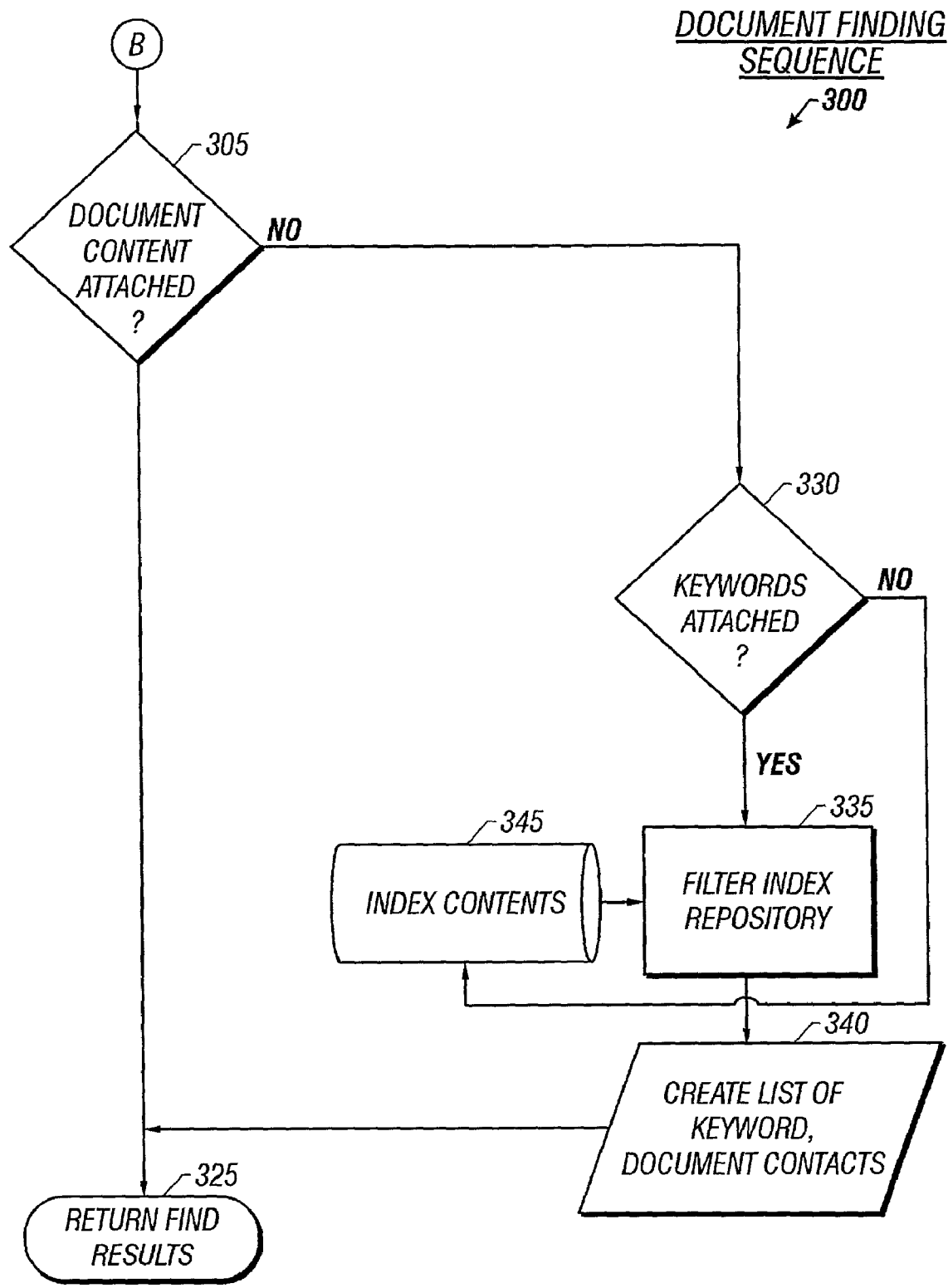
FIG. 5 is a flow diagram illustrating a document finding sequence for locating a document stored within the document storage assembly of FIG. 4.

Accordingly, included in the archiving process of retrieving documents associated with a document command, the request processor 42 in the document finding sequence 300, illustrated in FIG. 5, searches for and retrieves relevant document(s) stored within the document storage assembly 28. The document finding sequence 300 is preferably configured to accommodate document contact cards 70.

In step 305, the document processor 52 determines whether a document command includes a document contact card 70. By optimally referencing for document content, the document contact card 70 expedites document retrieval by the document storage repository 50. In step 305, if a document contact card 70 is attached, the document processor 52 advances to step 325 to instruct the document accessor 54 to retrieve the appropriate document(s) from the document repository 56 based on the document contact card 70.

On the other hand, if the document command does not include a document contact card, the document processor 52 generates a keyword list by filtering keywords provided by the document command message 90 through the index repository 48. It should be said that, because there are potentially fewer words to filter through in the index repository 48 than the number of words in the document repository 56, filtering for keywords through the index repository 48 is preferably faster than filtering for keywords in the document repository 56.

In particular, the document processor 52 in step 330 determines whether keywords are provided by the document command in a format other than a document contact card, such as a document command message 90 generated by the RCD 13. For provided keywords, the document processor in step 335 filters for similar keywords from the index identification codes in the index repository 48 and, in step 340, generates a keyword location list that is identical to the keyword location list of step 320.

Alternatively, for a lack of keywords, the document processor 52 in step 345 extracts keywords from the document command operand information before advancing to step 335. Commonly, for example, a document command "print 5.2S" may give just an index identifier for "5.2S". If keywords are not provided, however, the document processor 52 will extract "5.2S" from the document command and locate and retrieve the corresponding document with the index identification code of "Spanish Printer Sales Manual Ver. 5.2S". Thus, the document finding sequence 300 advances from step 340 to step 325 so that the document accessor 54 retrieves the appropriate document(s) from the document repository 56.

Furthermore, as shown in FIG. 1, the universal remote interface assembly 22 includes document provider 60. The document provider 60 is linked with the document processor 52 and the request processor 42 so as to execute a document command. The document provider 60 ultimately sends a print job command to the remote printer 15. Regardless of make and model, the remote printer 15 prints a document(s) based on the print job command sent with internet addressable protocols to the printer object, i.e. the remote printer 15.

The document provider 60 includes a print processor 62. Similar to the request formatter 33 of the request interface 30, the print processor 62 preferably includes software components for accommodating the document storage assembly 28. The document provider 60 is linked with the document storage repository 50 as well as with the document indexing engine 40. The print processor 62 thus receives a document command from the request processor 42.

Illustratively, for new documents introduced to the network addressable device 20 by a document command from the RCD 13, the document processor 52 will preferably receive a document command from the request processor 42. On the other hand, for previously stored documents, the print processor 62 will receive a document command from the request processor 42.

The print provider 60 includes a printer interface 65. The printer interface 65 is linked with the print processor 62 and with the desired remote printer 15. Operating instructions from the document command includes a printer network destination address for enabling the printer interface 15 to distinguish and connect with the desired remote printer 15.

Once the desired remote printer 15 is selected, the print processor 62, through the printer interface 65, determines the appropriate internet addressable protocol by which to send a print job command to the remote printer 15. Specifically, in one preferred embodiment, the print processor 62 distinguishes an applicable internet addressable protocol by determining whether the remote printer 15 supports either SMTP printing with a common document format, such as PS/PDF, or IPP printing.

When printer support is determined by the printer interface 65, the print processor 62 sends the document(s) to be printed to a document rendering unit 63 for rendering. Rendering constitutes configuring each desired document for printer attributes suitable for transmission from the network addressable device 20 to the desired remote printer 15.

Specifically, to optimally enhance printer image output, the document rendering unit 63 in one preferred embodiment queries the remote printer 15 via applicable internet addressable protocol, such as IPP. The rendering unit 63 thus determines the operating system mechanism used by the remote printer 15. Once the remote printer's 15 operating system mechanism is established, the document rendering unit 63 renders document(s) based on the remote printer's 15 attributes. In another preferred embodiment, the document rendering unit 63 includes an operating system based rendering system. Illustratively, for example, the operating system based rendering system selectively uses PCL3 code structure, the base component for a rendered image, with given operating system rendering mechanisms.

Once rendered, the print processor 62 generates a print job command containing the desired document(s). With the printer interface 65, the print processor 62 transmits the print job command to the remote printer 15. Based on the appropriate print job protocol for the selected remote printer 15, the print job command includes operating instructions and operand information for printing a document(s) on the remote printer 15.

Figure 6:
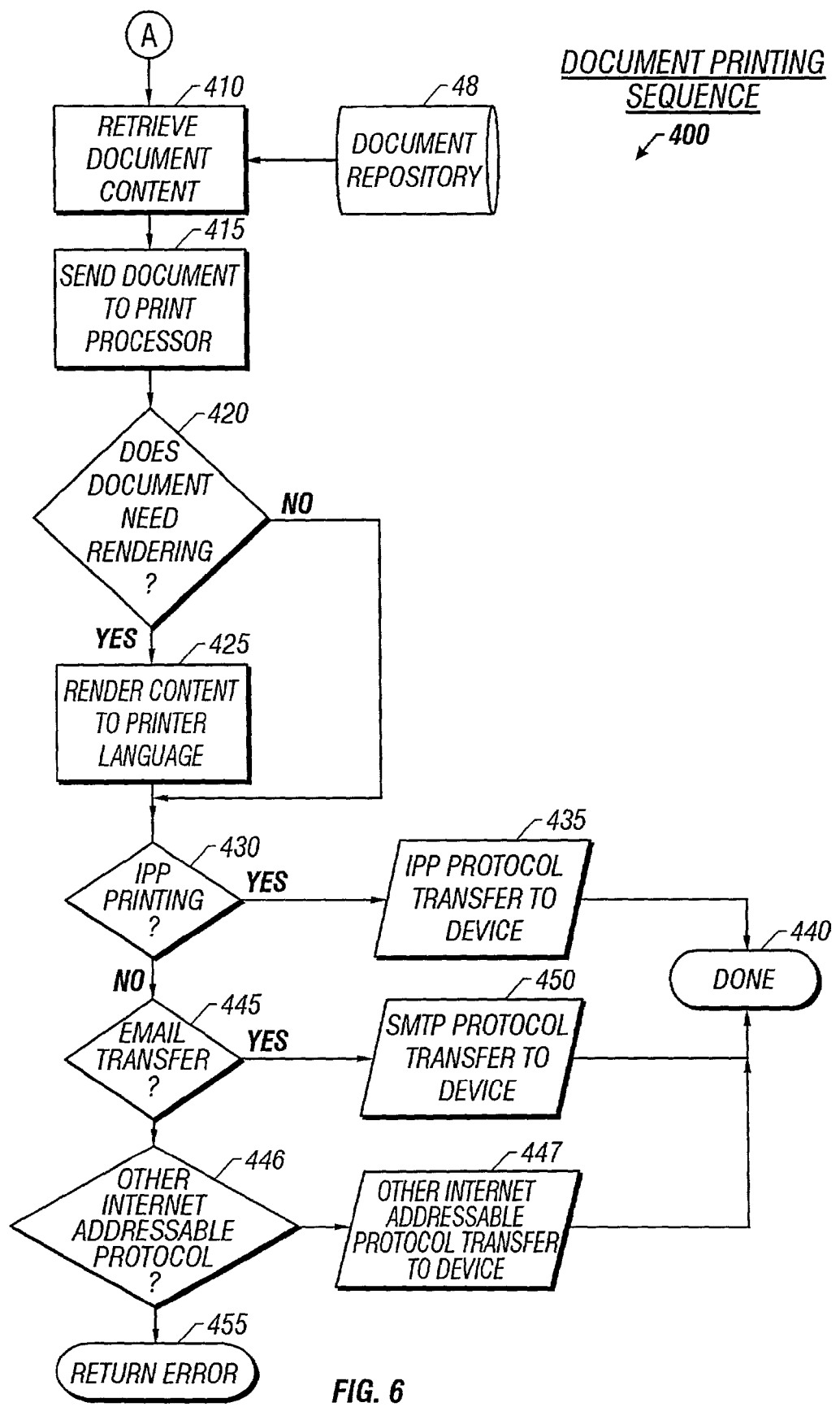
FIG. 6 is a flow diagram illustrating a document printing sequence for transmitting a document from the document storage assembly of FIG. 4 to any printer.

Referring to FIG. 6, a document printing sequence 400 is provided for the document command requiring a printing operation. In step 410, the document processor 52 with the document assessor 45 retrieves the appropriate document(s) from the document repository 56. In step 415, the document processor 52 then sends the appropriate documents to the print processor 62.

In step 420, the print processor 62 with the printer interface 65 determines the appropriate protocol by which to send a print job command to the desired remote printer 15. Also, in step 420, the print processor 62 determines whether the document(s) needs to be rendered according to the appropriate format or "attributes" required by the desired remote printer 15. If the document(s) requires rendering, the print processor 62 in step 425 sends the document(s) to the document rendering unit 63. If the document(s) do not require rendering, the document printing sequence 400 advances from step 420 to steps 430–450.

In step 430–450, the print processor 62, within an applicable internet addressable protocol format, generates a print job command containing the desired document(s). Specifically, in one preferred embodiment, the print processor 62 generates a print job command containing the desired document(s) in accordance with internet addressable protocols, in either IPP protocol, steps 430–435, or SMTP protocol, steps 445–450.

Specifically, the print processor 62 in step 430 determines whether the document(s) should be sent to the remote printer 15 in IPP protocol. If IPP is desired, the printer interface 65 transmits the document(s) to the remote printer 15 in IPP via a print job command to thus complete the document printing sequence 400 in step 440. Alternatively, if SMTP protocol is desired, the printer interface 65 transmits the document(s) to the remote printer 15 in SMTP via a print job command to thus complete the document printing sequence 400 in step 440. In addition, if the neither IPP nor SMTP is desired, the printer processor 62 will advance to step 446 to determine whether other internet addressable protocol(s) are required. In step 447, the printer processor 62 sends the print job command via internet addressable protocol(s) to the remote printer 15. If no internet addressable protocol(s) are desired, the printer processor 62 in step 455 will indicate an error to the requesting RCD 13.

In summary, the universal printing system 10 includes network addressable device 20. The network addressable device 20 includes universal remote interface assembly 22 and document storage assembly 28. Through the network addressable device 20, a user of the RCD 13 stores, retrieves, and/or prints documents on the remote printer 15. In particular, the universal remote interface assembly 22 provides that user with remote access to the network addressable device 20 via SMTP and preferably transmits a resulting print job command to the remote printer via internet addressable protocols.

While the present invention has been disclosed in connection with the preferred embodiment thereof, it should be understood that there may be other embodiments which fall within the spirit and scope of the invention as defined by the following claims.

What is claimed:

1. A network addressable device in a communications network for use with a network addressable printer object, the network addressable device comprising:
  (a) a document storage assembly; and
  (b) a universal remote interface assembly linked to the document storage assembly and, via the network, to the network addressable printer object wherein the universal remote interface assembly is configured to receives from a remote communications device a document command message for accessing the document storage assembly, the document command message identifying a particular network addressable printer object and including an attached document contact card identifying a particular stored document the universal remote interface assembly being further configured to transmit a print job for the particular stored document and print job command to the particular network addressable printer object.

2. The network addressable device according to claim 1 wherein the universal remote interface assembly includes:
  (a) a request interface.

3. The network addressable device according to claim 2 wherein the request interface comprises a Simple Mail Transfer Protocol server.

4. The network addressable device according to claim 1 wherein the universal remote interface assembly includes:
  (a) a document provider.

5. The network addressable device according to claim 4 wherein the document provider renders a document.

6. The network addressable device according to claim 4 wherein the document provider transmits the document from the network addressable device to the network addressable printer object.

7. The network addressable device according to claim 2 wherein the document storage assembly includes:
  (a) a document indexing engine linked with the request interface.

8. The network addressable device according to claim 7 wherein the document indexing engine synchronizes a document.

9. The network addressable device according to claim 7 wherein the document indexing engine generates a contents index based on the document command.

10. The network addressable device according to claim 4 wherein the document storage assembly includes a document repository linked with the document provider.

11. The network addressable device according to claim 10 wherein the document repository stores a document.

12. The network addressable device according to claim 10 wherein the document repository sends a document to the document provider.

13. Computer code on computer readable media for facilitating remote access and printing of documents on a printer object included in a communications network, the computer code product comprising:
  (a) a document storage assembly computer code for archiving a document in a document storage assembly; and
  (b) a universal remote interface assembly computer code for remotely accessing via the network and printing the document on the printer object wherein the universal remote interface assembly computer code, when executed, is configure to receives from a remote communications device a document command message for accessing the document storage assembly, the document command message identifying a particular network addressable printer object and including an attached document contact card identifying a particular stored document the universal remote interface assembly code, when executed, being further configured to transmit a print job for the particular stored document and print job command to the particular network addressable printer object.

14. The computer code according to claim 13 wherein the universal remote interface assembly computer code product includes a request interface code product for receiving a document command according to Simple Mail Transfer Protocol.

15. In an communications network, a method for remotely accessing and printing of documents on a printer object, comprising the steps of:
  (a) linking a universal remote interface assembly with a document storage assembly;

(b) remotely accessing the universal remote interface assembly via a document command message wherein the universal remote interface assembly receives from a remote communications device the document command message for accessing the document storage assembly, the document command message identifying a particular network addressable printer object and including an attached document contact card identifying a particular stored document; and (c) the universal remote interface assembly transmitting a print job for the particular stored document and print job command to the particular network addressable printer object.

16. The method according to claim 15 wherein the step of remotely accessing the universal remote interface assembly includes the step of receiving the document command according to Simple Mail Transfer Protocol.

* * * * *

UNITED STATES PATENT AND TRADEMARK OFFICE
CERTIFICATE OF CORRECTION

PATENT NO. : 7,042,586 B2 Page 1 of 1
APPLICATION NO. : 09/874482
DATED : May 9, 2006
INVENTOR(S) : Binnur Al-Kazily et al.

It is certified that error appears in the above-identified patent and that said Letters Patent is hereby corrected as shown below:

In column 15, line 57, in Claim 1, delete "receives" and insert -- receive --, therefor.

In column 16, line 47, in Claim 13, delete "configure" and insert -- configured --, therefor.

In column 16, line 47, in Claim 13, delete "receives" and insert -- receive --, therefor.

In column 16, line 63, in Claim 15, delete "an" and insert -- a --, therefor.

Signed and Sealed this

Second Day of June, 2009

JOHN DOLL
*Acting Director of the United States Patent and Trademark Office*